(12) United States Patent
McNamara

(10) Patent No.: US 6,298,979 B1
(45) Date of Patent: Oct. 9, 2001

(54) WORKPIECE TRANSFER APPARATUS WITH OVERHEAD ACTUATOR

(75) Inventor: Jeffrey S. McNamara, Grosse Ile, MI (US)

(73) Assignee: Unova IP Corp., Woodland Hills, CA (US)

( * ) Notice: Subject to any disclaimer, the term of this patent is extended or adjusted under 35 U.S.C. 154(b) by 0 days.

(21) Appl. No.: 09/384,612

(22) Filed: Aug. 27, 1999

Related U.S. Application Data
(60) Provisional application No. 60/130,776, filed on Apr. 23, 1999.

(51) Int. Cl.[7] .................................................. B65G 25/00
(52) U.S. Cl. ............................................. 198/774.1
(58) Field of Search ........................ 198/773, 774.1, 198/774.3, 468.6

(56) References Cited

U.S. PATENT DOCUMENTS

| | | | |
|---|---|---|---|
| Re. 32,804 | * 12/1988 | Mason ................................ | 198/774 |
| 2,033,848 | * 3/1936 | Morris et al. ..................... | 146/194 |
| 2,088,284 | * 7/1937 | Bertrand ............................ | 198/219 |
| 2,930,333 | * 3/1960 | Leeuwrik .......................... | 107/56 |
| 3,016,004 | * 1/1962 | Harper, Jr. et al. .............. | 99/255 |
| 4,669,607 | * 6/1987 | Mason ................................ | 198/468.6 |
| 4,781,285 | * 11/1988 | Schlatter et al. ................. | 198/774.1 |
| 4,865,180 | * 9/1989 | Brems et al. ..................... | 198/468.6 |
| 5,730,278 | * 3/1998 | Baba et al. ....................... | 198/774.3 |

* cited by examiner

Primary Examiner—Joseph E. Valenza
(74) Attorney, Agent, or Firm—Reising, Ethington, Barnes, Kisselle, Learman & McCulloch, P.C.

(57) ABSTRACT

A workpiece transfer apparatus with a shuttle underlying workpieces received on workstations which is raised and lowered by a lifting mechanism disposed above the workpieces. The shuttle has a support rail and an indexing rail operably connected to a drive for advancing and retracting the indexing rail relative to the workstations. To transfer one or more workpieces from their current workstations to respective subsequent workstations, the shuttle is raised by the overhead lifting mechanism to engage the workpieces from underneath and raise the workpieces from their current workstations. The indexing rail is advanced to position the workpieces above respective subsequent workstations and the shuttle is lowered to place the workpieces on these subsequent workstations. Subsequently, the indexing rail is retracted to its starting position so that the apparatus is ready for the next transfer cycle.

16 Claims, 6 Drawing Sheets

WORKPIECE TRANSFER APPARATUS WITH OVERHEAD ACTUATOR

REFERENCE TO PROVISIONAL PATENT APPLICATION

This application claims the benefit of Provisional Patent Application U.S. Ser. No. 60/130,776 filed on Apr. 23, 1999.

FIELD OF THE INVENTION

This invention relates generally to multiple station workpiece transfer systems and more particularly to a transfer mechanism for moving workpieces from one station to another.

BACKGROUND OF THE INVENTION

Various devices are known which have multiple workstations and a mechanism for lifting and carrying workpieces from one station to another. In one device, a shuttle underlies the workpieces and is raised and lowered generally vertically by elevators or lift mechanisms underlying the shuttle. The elevators or lift mechanisms are actuated by a drive mechanism to raise the shuttle and hence lift the workpieces from their current workstations. The shuttle is advanced to transfer each workpiece to a successive workstation and then lowered to deposit each workpiece in its successive workstation and subsequently the shuttle is retracted to its starting position.

With the elevators or lift mechanisms underlying the shuttle, the shuttle has a beginning or lowest height which is raised from the floor. To ensure that the shuttle can clear and be moved below the workpieces when received in their workstations, the workstations must have a sufficient height above the floor and above the shuttle in its lowest position. Further, to ensure that the workpieces clear their workstations when lifted by the shuttle, a relatively long vertical stroke of the shuttle is required. Each of these factors results in undesirably excessive vertical height above the floor of the workpieces when deposited on their workstations, and instability of the shuttle and workpieces when raised. Moreover, the elevators or lift mechanisms and any drive mechanisms underlying the shuttle are highly susceptible to becoming contaminated and malfunctioning due to dirt, chips and the like falling off the workpieces and fouling the mechanism.

Another type of device which is used for transferring workpieces to consecutive workstations is commonly referred to as an overhead lift and carry device. A typical overhead lift and carry device has its lifting mechanism and shuttle disposed above the workstations and workpieces thereon. A plurality of clamping or gripping devices are carried by the shuttle and are separately actuated to grip each workpiece from above the workpiece to lift it off of a workstation so that it may be carried to a successive workstation. The overhead lift and carry device solves some of the problems of the lift and carry devices wherein the lifting mechanisms and shuttle are disposed below the workpiece but has an undesirably long cycle time, increased complexity due to the addition of the clamping devices and may be less safe because the parts are supported and carried from above and thus may be dropped should a clamping device fail. Further, repair hoists or the like cannot be readily moved above the workpieces because they will interfere with the overhead shuttle and clamping devices.

To complete one cycle of a typical overhead lift and carry device, the shuttle must be lowered to dispose the clamps adjacent to their respective workpieces on the workstations. The clamps must then be closed on each workpiece to grip it and the shuttle must be raised vertically to remove the workpieces from the workstations. Thereafter, the shuttle is advanced to dispose the workpieces above successive workstations and then lowered into these successive workstations. The clamps must then be released or opened to deposit the workpieces in the workstations and the shuttle raised and thereafter returned to its original position to begin another cycle. Notably, this eight step cycle takes a considerable amount of time and thus, lowers the rate of production of the workpieces and thereby increases the cost to manufacture the parts. Further, the increased complexity of the overhead lift and carry device along with the increased number of moving parts of the device decrease its efficiency and reliability in use.

SUMMARY OF THE INVENTION

An improved workpiece transfer apparatus with a shuttle underlying workpieces received in workstations which is actuated by a lifting mechanism disposed above the workpieces. The shuttle has a support rail and an indexing rail operably connected to a drive for movement relative to the support rail. To transfer workpieces from their current workstations to subsequent workstations, the shuttle is raised by the overhead lifting mechanism to engage the workpieces from underneath and raise the workpieces from their current workstations. The indexing rail is advanced to position the workpieces over subsequent workstations and the shuttle is lowered to deposit the workpieces in these subsequent workstations. Subsequently, the indexing rail is retracted to its starting position so that the apparatus is ready for the next transfer cycle.

Desirably, this apparatus has all of the advantages of a conventional overhead lift and carry device without its notable disadvantages. More specifically, the number of moving parts is reduced, no clamps are necessary to lift a workpiece from above, the workpiece is supported from underneath and the apparatus has a significantly shorter cycle time compared to a conventional overhead lift and carry device. Further, because the lift mechanism and any drive mechanism is disposed above the workpieces, the shuttle may be disposed closely adjacent to the floor in its lowered position to thereby enable the height of the workstations to be lowered to a more suitable working height. Also, with the lift mechanism above the shuttle as opposed to underneath it, the fixtures and the tools in the workstations may be readily moved or changed when the shuttle is raised above them because there is no lift mechanism nor any drive mechanism below the shuttle to interfere with movement of the fixtures and/or tools. The lift mechanism may provide substantially straight, vertical movement of a support rail of the shuttle and may utilize a Scott Russell linkage or other linear motion lifting mechanism or substantially any other lifting mechanism with the support rail restrained to move only in a single plane such as by a linear slide bearing and guide rail device.

Objects, features and advantages of this invention include providing a workpiece transfer apparatus which permits workstations and workpieces therein to be disposed at a convenient working height, enables a long lifting stroke for vertical travel, has a relatively short and uncomplicated working cycle, removes the lifting mechanism from contamination by dirt and debris dropping from the workpieces, supports the workpieces from underneath to eliminate the risk of the workpieces being dropped, increases the number of workstations which may be disposed in a given floor space, is rugged, durable, reliable, relatively service and maintenance free, and of relatively simple design and economical manufacture and assembly and in service has a long useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Figure 2:
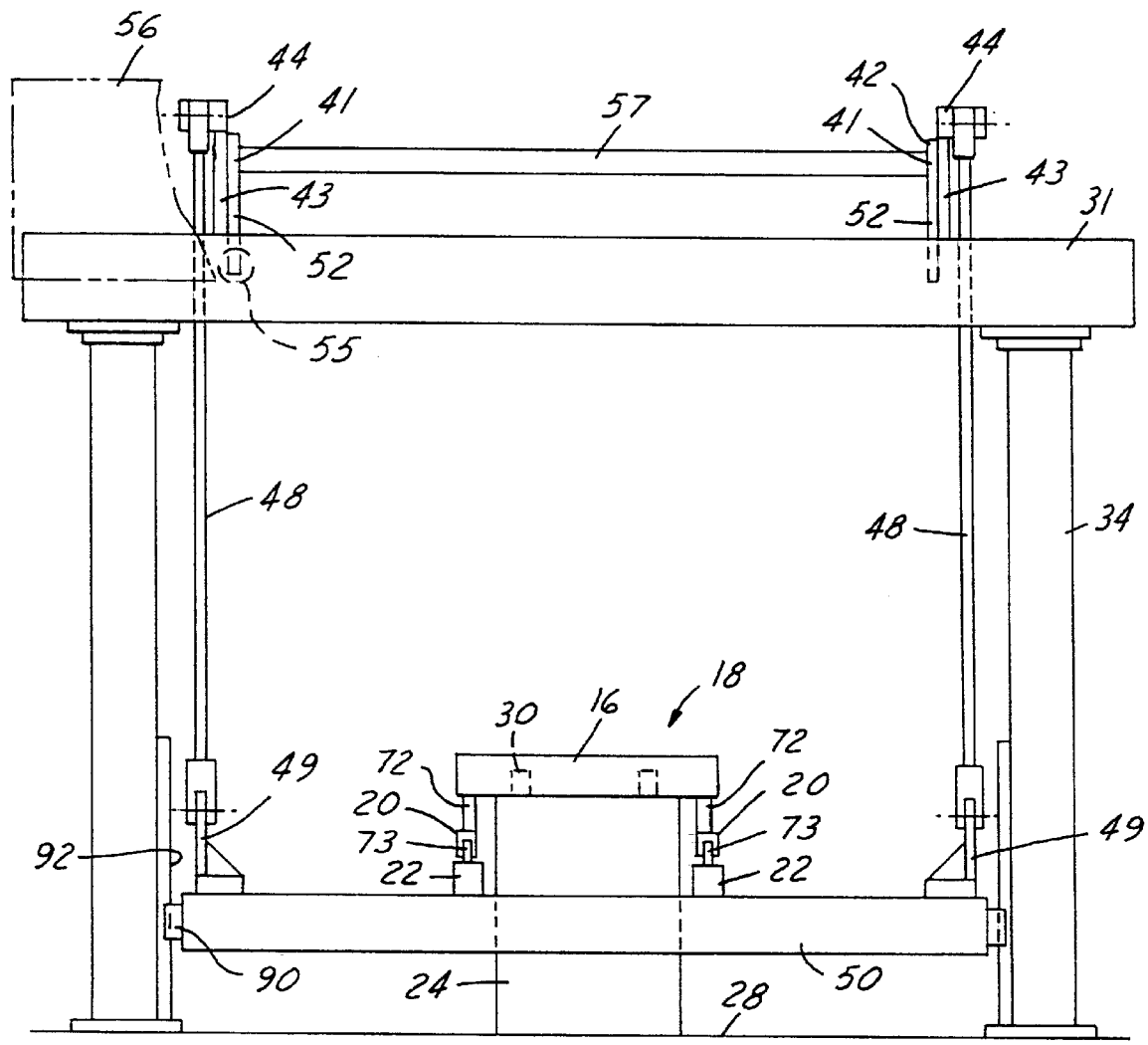
FIG. 2 is an end view of the workpiece transfer apparatus of FIG. 1.
Figure 3:
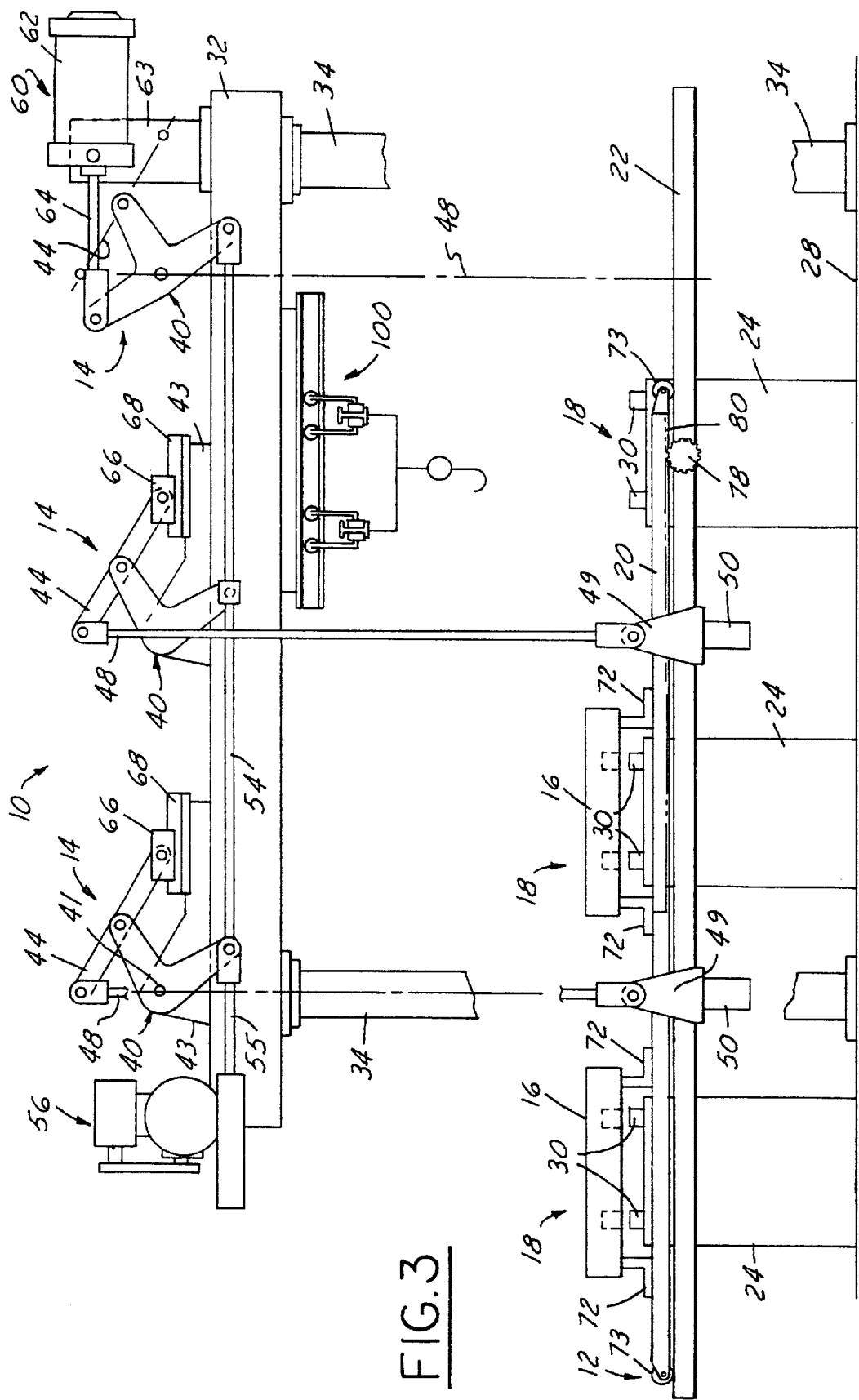
FIG. 3 is a side view of the workpiece transfer apparatus of FIG. 1 in a second position.
Figure 4:
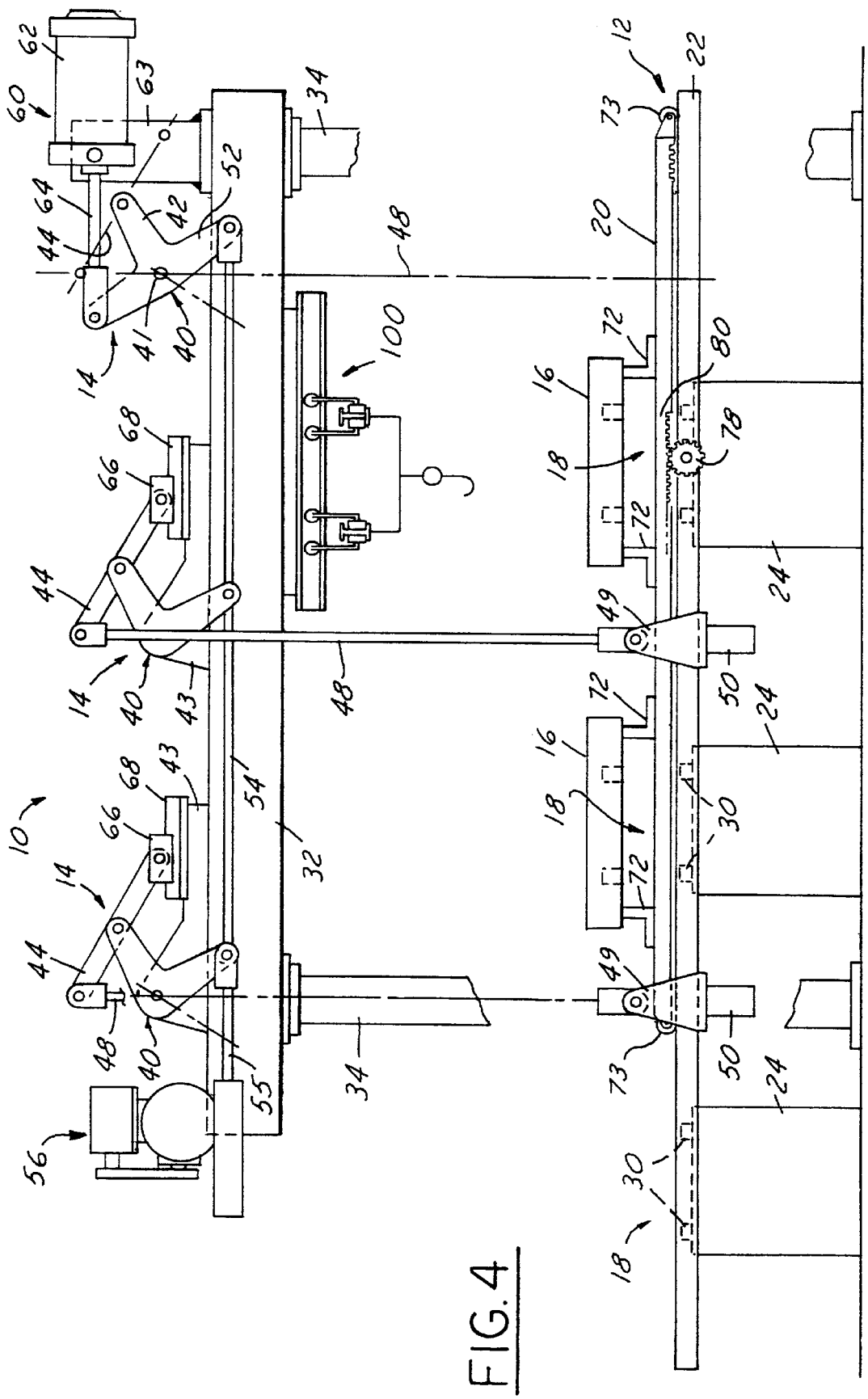
FIG. 4 is a side view of the workpiece transfer apparatus of FIG. 1 in a third position.

Referring in more detail to the drawings, FIGS. 1–5 illustrate a workpiece transfer apparatus 10 having a shuttle 12 actuated by lifting mechanisms 14 disposed above the shuttle 12. The shuttle 12 is disposed beneath various workpieces 16 each received in a separate workstation 18. To transfer the workpieces 16 from their current workstations 18 to subsequent workstations 18, the shuttle 12 is raised by the lifting mechanisms 14 to lift the workpieces 16 off of their workstations 18 (FIG. 3), and indexing rails 20 of the shuttle 12 are advanced relative to support rails 22 of the shuttle 12 to dispose the workpieces 16 over their subsequent workstations 18 (FIG. 4). The shuttle 12 is then lowered to place the workpieces 16 in the subsequent workstations 18 (FIG. 5) and the indexing rails 20 are retracted to their starting position so that the apparatus 10 is ready for the next transfer cycle.

Each workstation 18 has a base 24 received on a floor 28 and locator pins 30 extending therefrom which are received through holes in the workpiece 16 to accurately align and locate the workpiece 16 in the workstation 18. To properly position the workpieces 16 in the workstations 18 on the locator pins 30, the workpieces 18 must be raised and lowered generally vertically relative to the workstations 18 by the lift mechanisms 14.

The lift mechanisms 14 may be attached to a ceiling or supported on a box frame with transverse stringers 31 fixed to laterally spaced apart beams 32 connected to uprights 34 extending from the floor 28. As shown in FIG. 2, parallel sets of lift mechanisms 14 are provided to carry and move opposed sides of the shuttle 12. Each lifting mechanism 14 preferably has a bell crank 40 mounted on a pivot 41 fixed to a support plate 43 connected to the beam 32. The bell crank has a first arm 42 pivotally connected to a lifting link 44 which is pivotally connected at one end 46 to one end of a link or rod 48 which at its other is pivotally connected to a plate 49 attached to a cross rail 50 extending underneath each support rail 22 of the shuttle 12. A second arm 52 of each bell crank 40 is pivotally connected to a drag link 54 which is operably connected to an actuating rod or ball screw 55 of a drive mechanism 56 which actuates the lifting mechanisms 14. So that all of the lifting mechanisms 14 may be actuated by a single drive 56, the two bell cranks 40 of each set are connected together to rotate in unison by a torque tube 57 (FIG. 2) concentric with their pivots 41 and fixed at its ends to the two bell cranks. Actuating each lifting mechanism 14 with a single drive 56 ensures that the lifting mechanisms 14 are driven in unison to provide a stable and controlled movement of the shuttle 12.

The lift drive 56 may be of substantially any type to advance and retract the drag link 54, such as a reversible electrical motor, hydraulic cylinder or pneumatic cylinder. If desired, the torque tubes 57 may be eliminated, and two separate drives 56 and drag links 54 provided, one on each side, to actuate the lift mechanisms 14. In any arrangement, both sets of link mechanisms 14 are driven in unison to provide an uniform, level and stable movement of the shuttle 12. To improve the stability of the apparatus 10, a counterbalance 60 is connected to the lift mechanisms 14 opposite the lift drive(s) 56. The counterbalance 60 is preferably a pneumatic cylinder 62 mounted by pivots 61 of a support 63 on the beam 32 with an actuating rod 64 pivotally connected to a third arm 65 of the end bell crank 40 of the adjacent lift mechanism 14 to cushion and counterbalance movement of the shuttle 12 and the workpieces.

Figure 6:
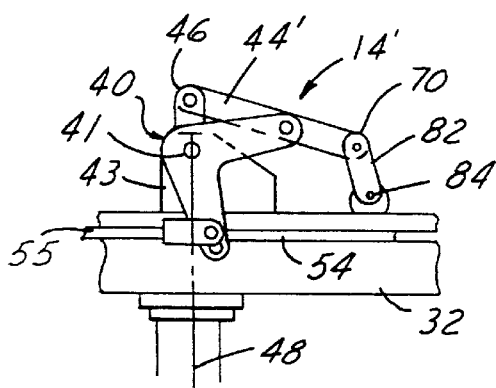
FIG. 6 is fragmentary side view of a modified lift mechanism.

To provide a true, straight line vertical motion for raising and lowering the shuttle 12, a second end 70 of the lifting link 44, opposite the end 46, is fixed to a linear slide 66 with bearings received on a guide track 68 carried by support plate 43. The slide 66 and guide track 68 cause the one end 46 of the lifting link 44 to move along a straight line path perpendicular to the line of the horizontal motion of the second end 70 of the lifting link 44 and intersecting the axis of the fixed pivot 41 of the bell crank 40. Thus, as the lift drive 56 either advances or retracts the drag link 54 to rotate the bell cranks 40 in unison about their pivots 41, the lifting links 44 provide an essentially straight line vertical motion of the rods 48 to raise and lower the shuttle 12 relative to the workpieces 16. Alternatively, as shown in FIG. 6, lift mechanisms 14' may utilize Scott Russell linkages to provide linear, vertical movement for the shuttle 12. These lift mechanisms 14' have a short link 82 which at one end is pivotally connected to the second end 70 of lift link 44 and at the other end pivotally connected to a support plate 84 fixed to the beam 32. As is well known, such a linkage provides an essentially straight line or linear motion of the pivotal connection to rods 48.

The shuttle 12 underlies the workpieces 16 in the workstations 18 and has a pair of laterally spaced apart support rails 22 connected to the lifting links 44 through the links or rods 48 and fixed to cross rails 50, and a pair of indexing rails 20 mounted for reciprocation on the support rails 22. When the shuttle 12 is raised, the workpieces 16 are received on locator and support fixtures 72 fixed to the indexing rails 20.

Each indexing rail 20 has rollers 73 attached thereto and received in a guide track 74 fixed to its associated support rail 22 to guide the linear reciprocation of the indexing rail 20 relative to the support rail 22. An indexing drive 76 is carried by the shuttle 12 and operably connected to the indexing rails 20 to reciprocate the indexing rails 20 relative to the support rails 22. The indexing drive 76 preferably comprises a reversible electric motor (not shown) which rotates in unison a pair of drive gears 78 each meshed with a separate rack 80 fixed to each indexing rail 20. However, substantially any other type of drive may be used which is capable of reciprocating the indexing rails 20 relative to the support rails 22.

Figure 7:
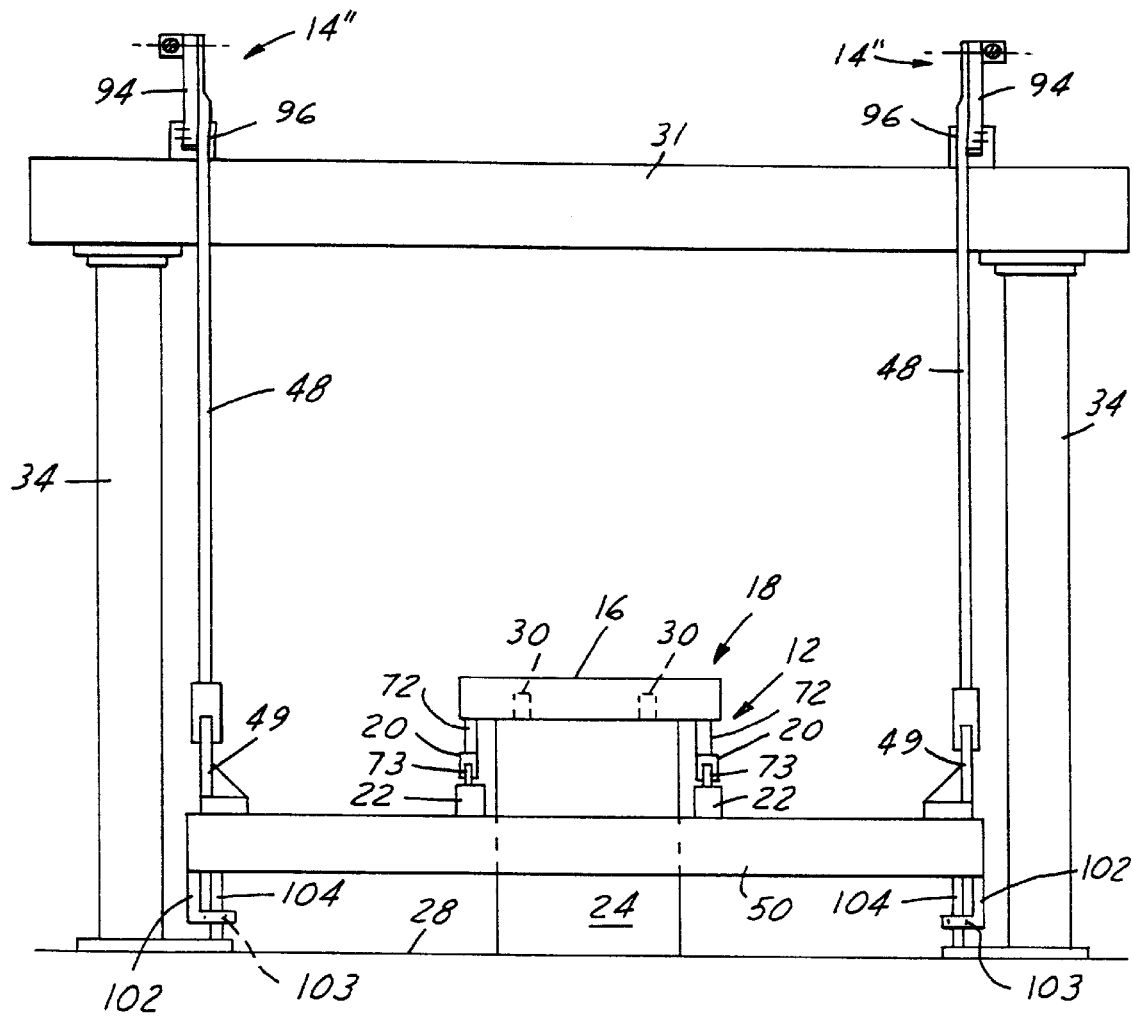
FIG. 7 is an end view of a modified workpiece transfer apparatus.
Figure 8:
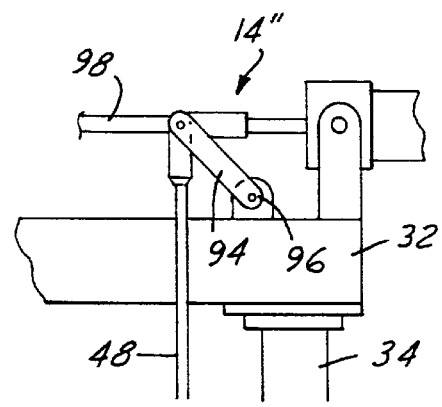
FIG. 8 is a fragmentary side view illustrating the lift mechanism of FIG. 7.

As shown in FIG. 2, the shuttle cross rails 50 are attached at each end to a linear slide 90 constrained for essentially vertical motion in a guide track 92 to limit the movement of the shuttle 12 to only vertical motion relative to the workstations 18. Of course, other assemblies may be used to control the movement of the shuttle 12 relative to the workstations 18. For example, as shown in FIG. 7, the lateral movement of the shuttle 12 may be eliminated by providing a follower 102 with a bushing 103 slidably received on a guide pin 104 fixed to the floor 28 at one end. As shown in FIGS. 7 and 8, with the cross rails 50 and hence, the shuttle 12 so constrained, lifting mechanisms 14" of substantially any type may be used such as a single arm 94 pivoted at one end 96 such that its free end swings on an arc. Desirably, each lifting mechanism 14" is still interconnected by a drag link 98 to synchronize the lifting mechanisms 14". In any event, when desired, to accurately place the workpieces 16 on the workstations 18, the lifting and lowering of the shuttle 12 can be essentially vertical relative to the workpieces 16 if desired. Notably, if this essentially vertical movement of the shuttle 12 is not necessary, then greater freedom is provided for the apparatus 10, its lifting mechanisms 14 and its shuttle 12.

Operation

Figure 1:
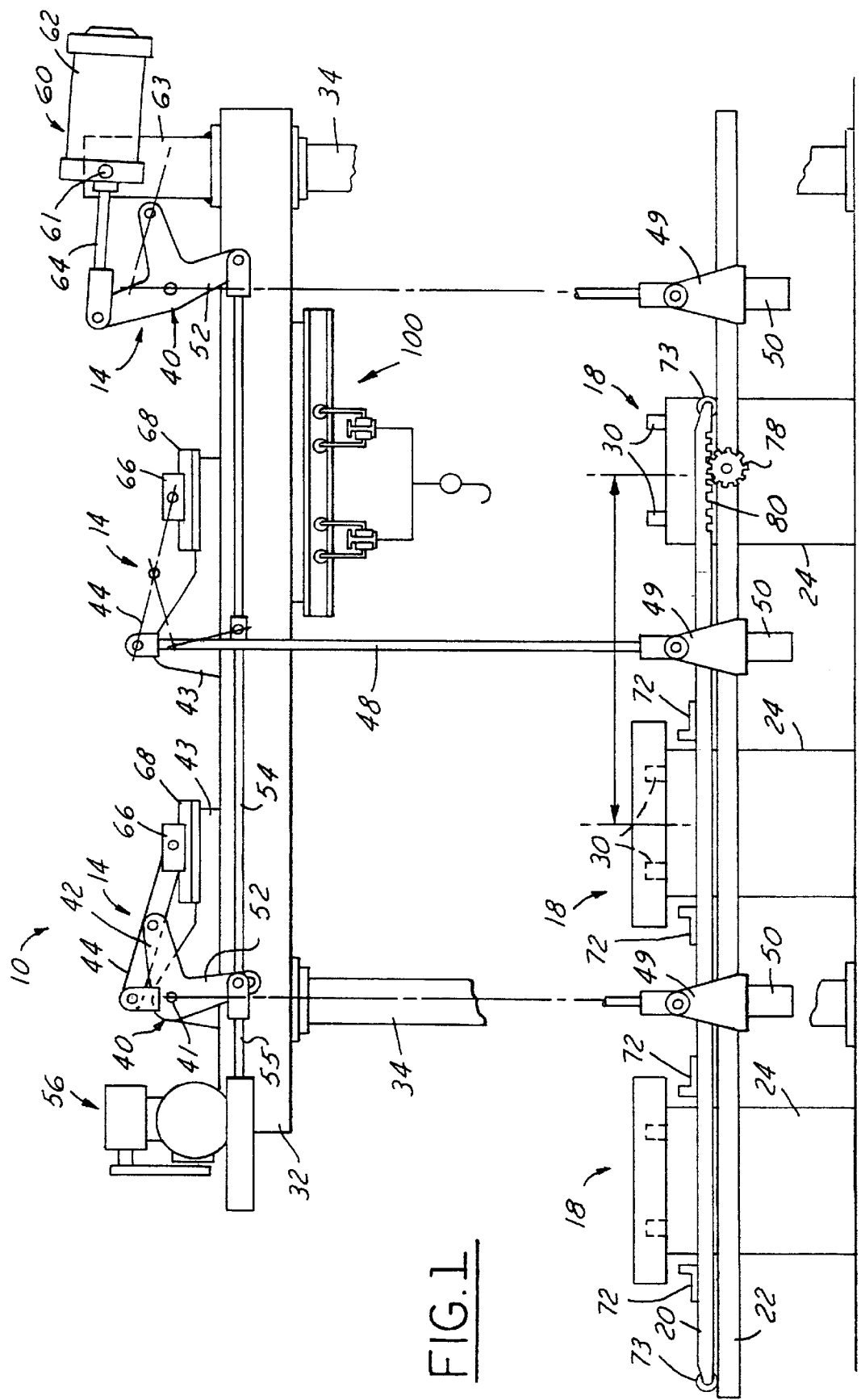
FIG. 1 is a diagrammatic side view of a workpiece transfer apparatus embodying this invention.
Figure 5:
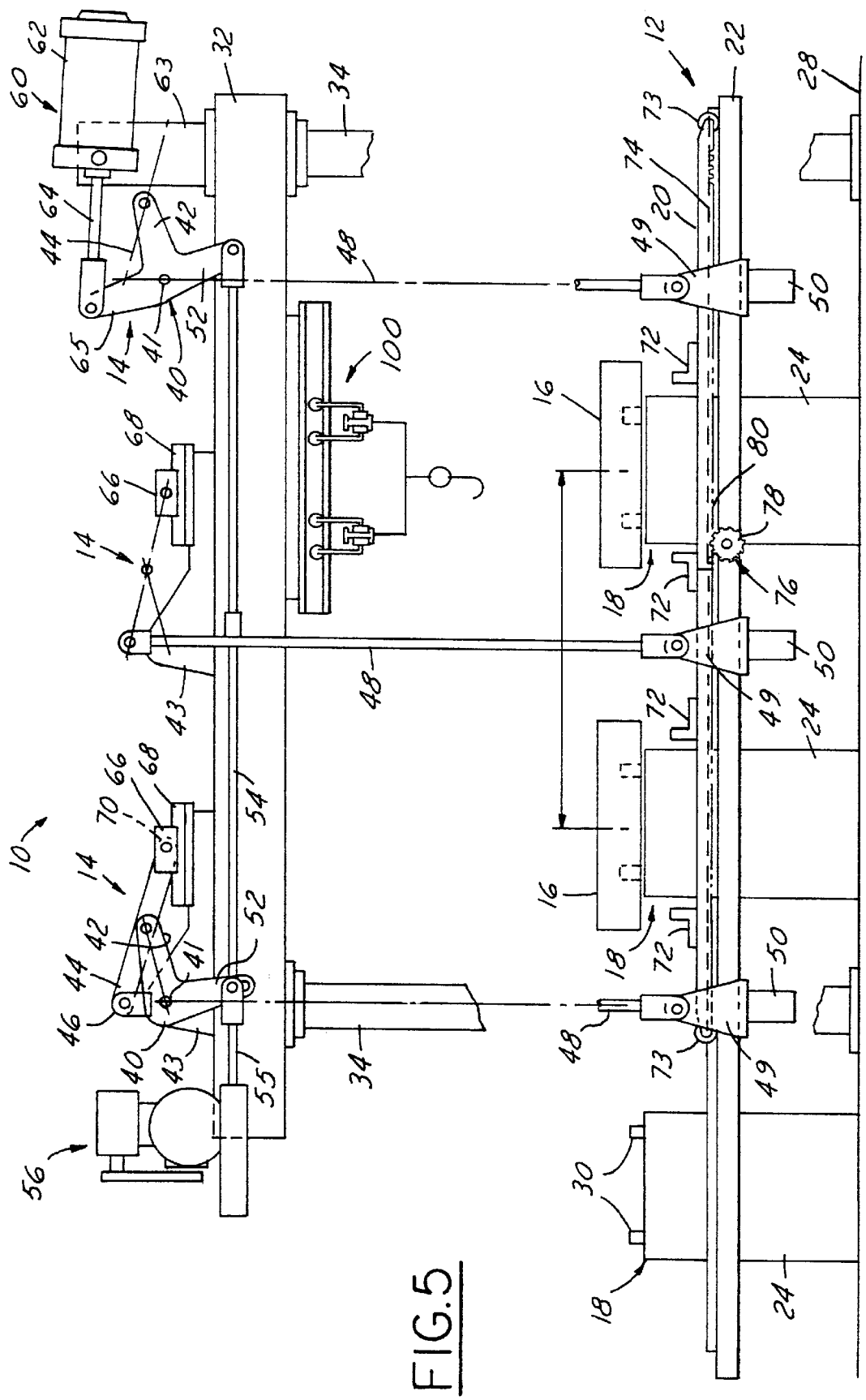
FIG. 5 is a side view of the workpiece transfer apparatus of FIG. 1 in a fourth position.

With a workpiece 16 disposed at each workstation 18 and with the shuttle 12 disposed below the workpieces 18, machining, assembly or other work may be performed on the various workpieces 16. For transferring the workpieces the indexing rails 20 are disposed in their retracted position as shown in FIG. 1. To transfer the workpieces 16 from their current workstations 18 to a subsequent workstation 18, the lift drive 56 is actuated to displace the drag link 54 and cause rotation of the bell cranks 40 generally counterclockwise about their pivots 41 as viewed in FIG. 1. This counterclockwise rotation of the bell cranks 40 causes an associated upward movement in unison of the lifting links 44 which are connected to the cross rails 50 to raise the shuttle 12 relative to the workstations 18 and to lift off and remove the workpieces 16 from the workstations 18 (FIG. 3). Next, the indexing drive 76 is actuated to advance the indexing rails 20 relative to the support rails 22 to thereby dispose the workpieces 16 above their respective subsequent workstations 18 (FIG. 4). To place the workpieces 16 on their subsequent workstations 18, the lift drive 56 is reversed to cause a generally clockwise rotation of the bell cranks 40 as viewed in FIG. 1. This causes downward motion of the lifting links 44, lowers the shuttle 12 and places the workpieces 16 on their respective subsequent workstations 18 (FIG. 5). After placing the workpieces 16 on the workstations 18, the shuttle 12 is lowered further so that the indexing rail 20 is clear of the workpieces 18 and then the indexing drive 76 is reversed to retract the indexing rails 20 relative to support rails 22. In this position, the transfer apparatus 10 is ready to perform another cycle to advance or transfer workpieces 16 to respective subsequent workstations 18.

In either embodiment, the lifting mechanisms 14, 14', 14" are disposed above the shuttle 12 which is disposed beneath the workpieces 16. Because there are no clamping devices and the shuttle 12 is not disposed above the workstations as in a conventional overhead lift and carry device, a repair hoist 100 may be used above the workpieces 16. Desirably, with the lift drive 56 and lifting mechanisms 14, 14', 14" out of the way of the workstations 18, fixtures and/or tools therein can be interchanged, or replaced when the shuttle 12 is raised and the workpieces 16 are removed from the workstations. This greatly increases the flexibility of the apparatus 10 which may be used with different workpieces 16 by simply changing the fixtures, tooling, locators and/or workstations. Further, with the lift drive 56 and lifting mechanisms 14, 14', 14" above the workstations 18, they are removed from the contaminants, coolants, chips, etc., which fall from the workstations 18 and which would otherwise foul the mechanisms. Still further, the shuttle 12 engages the workpieces 16 from underneath to reduce the complexity of the work cycle and to increase the safety in use of the apparatus 10. Still further, with the relatively thin links 48 extending between workstations 18, the workstations 18 can be closely grouped together to increase the number of workstations 18 disposed in a given floor space.

I claim:

1. A workpiece transfer device, comprising:

a shuttle having a support rail and an indexing rail carried by the support rail and movable relative to the support rail between a retracted position and an advanced position, the shuttle constructed to be disposed beneath at least one workpiece and being movable between a lowered position spaced from the workpiece and a raised position engaged with the workpiece and lifting the workpiece from a workstation;

at least one lift mechanism disposed above the shuttle and the workpiece, operably connected to the shuttle and movable between a first position and a second position to move the shuttle between its raised and lowered positions;

a first drive mechanism operably connected to the lift mechanism to move the lift mechanism between its first and second positions;

a second drive mechanism operably connected to the indexing rail to move the indexing rail between its retracted and advanced positions whereby, to transfer a workpiece from a first workstation to a subsequent workstation, the lift mechanism is actuated to move the shuttle from its lowered position to its raised position to lift the workpiece from said first workstation, the second drive mechanism is actuated to move the indexing rail from its retracted position to its advanced position to move the workpiece over said subsequent workstation, and the shuttle is moved to its lowered position to deposit the workpiece in said subsequent workstation; and a guide having a follower with an opening therethrough and a pin slidably received in the opening and one of the pin and the follower is connected to the shuttle to control the path of travel of the shuttle as it is moved between its lowered and raised positions.

2. The device of claim 1 wherein each lift mechanism is a Scott Russell linkage.

3. The device of claim 1 wherein the second drive mechanism comprises a rack and pinion gear set.

4. A workpiece transfer device, comprising:

a shuttle having a support rail and an indexing rail carried by the support rail and movable relative to the support rail between a retracted position and an advanced position, the shuttle constructed to be disposed beneath at least one workpiece and being movable between a lowered position spaced from the workpiece and a raised position engaged with the workpiece and lifting the workpiece from a workstation;

at least one lift mechanism disposed above the shuttle and the workpiece, operably connected to the shuttle and movable between a first position and a second position to move the shuttle between its raised and lowered positions;

a first drive mechanism operably connected to the lift mechanism to move the lift mechanism between its first and second positions;

a second drive mechanism operably connected to the indexing rail to move the indexing rail between its retracted and advanced positions whereby, to transfer a workpiece from a first workstation to a subsequent workstation, the lift mechanism is actuated to move the shuttle from its lowered position to its raised position to lift the workpiece from said first workstation, the second drive mechanism is actuated to move the indexing rail from its retracted position to its advanced position to move the workpiece over said subsequent workstation, and the shuttle is moved to its lowered position to deposit the workpiece in said subsequent workstation;

a guide to which the shuttle is connected to control the path of travel of the shuttle as it is moved between its lowered and raised positions; and the shuttle also has at least one cross rail extending generally perpendicular to and underlying the support rail with the at least one cross rail operably connected to the guide.

5. The device of claim 4 wherein the lift mechanism has a bell crank mounted for rotation about a pivot and having a first arm operably connected to the first drive mechanism and a second arm, a lift link connected to the second arm between the first and second ends of the lift link, operably connected at a first end to the shuttle and at its second end to a slide assembly to permit sliding movement of the second end of the lift link relative to the pivot of the bell crank so that the lift mechanism causes an essentially straight line movement of the shuttle when driven by the first drive mechanism.

6. The device of claim 5 which also comprises at least one additional lift mechanism and a drag link operably connecting each lift mechanism to each other and the first drive mechanism.

7. The device of claim 5 wherein the drag link is connected to the first arm of each bell crank.

8. The device of claim 4 herein each lift mechanism is an arm pivoted at one end and operably connected to the first drive mechanism for pivotal movement about said one end.

9. The device of claim 1 wherein the shuttle also has at least one cross rail extending generally perpendicular to and underlying the support rail with each lift mechanism operably connected to a cross rail.

10. A workpiece transfer device, comprising:

a shuttle having a support rail and an indexing rail carried by the support rail and movable relative to the support rail between a retracted position and an advanced position, the shuttle constructed to be disposed beneath at least one workpiece and being movable between a lowered position spaced below a workpiece in a workstation and a raised position engaged with the workpiece and lifting the workpiece from the workstation;

at least one lift mechanism disposed above the shuttle and the workpiece, operably connected to the shuttle and movable between a first position and a second position to move the shuttle between its raised and lowered positions;

a first drive mechanism operably connected to the lift mechanism to move the lift mechanism between its first and second positions;

a second drive mechanism operably connected to the indexing rail to move the indexing rail between its retracted and advanced positions;

at least one cross rail extending generally perpendicular to and underlying the support rail with each lift mechanism operably connected to a cross rail; and a guide having a linear track extending vertically transversely to the support rail from below the workpiece, a follower engageable with the track, one of the follower and track connected to the shuttle, and the follower and track configured to constrain the shuttle support rail to vertical movement between its retracted and advanced positions;

whereby, to transfer a workpiece from a first workstation to a subsequent workstation, the lift mechanism is actuated to move the shuttle from its lowered position to its raised position to lift the workpiece from said first workstation, the second drive mechanism is actuated to move the indexing rail from its retracted position to its advanced position to move the workpiece over said subsequent workstation, and the shuttle is moved to its lowered position to deposit the workpiece in said subsequent workstation.

11. The device of claim 10 wherein the lift mechanism has a bell crank mounted for rotation about a pivot and having a first arm operably connected to the first drive mechanism and a second arm, a lift link connected to the second arm between the first and second ends of the lift link, operably connected at its first end to the shuttle and at its second end to a slide assembly to permit sliding movement of the second end of the lift link relative to the pivot of the bell crank so that the lift mechanism causes an essentially straight line movement of the shuttle when driven by the first drive mechanism.

12. The device of claim 11 which also comprises at least one additional lift mechanism and a drag link operably connecting each lift mechanism to each other and the first drive mechanism.

13. The device of claim 12 wherein the drag link is connected to the first arm of each bell crank.

14. The device of claim 10 wherein each lift mechanism has an arm pivoted at one end and operably connected to the first drive mechanism for pivotal movement about said one end.

15. The device of claim 10 which also comprises at least two spaced-apart and vertically extending links coupling the lift mechanism to the shuttle mechanism to raise the shuttle and lift a workpiece from a workstation, and to lower the shuttle and lower a workpiece into a workstation.

16. The workpiece transfer device of claim 15 wherein the vertical links do not move laterally with the shuttle as the shuttle moves a workpiece from the first workstation to a subsequent workstation.

* * * * *